United States Patent
Lechat et al.

(10) Patent No.: US 7,288,590 B2
(45) Date of Patent: Oct. 30, 2007

(54) ADHESIVES WITH IMPROVED DIE-CUTTING PERFORMANCE

(75) Inventors: Jacques S. Lechat, Braine L'Alleud (BE); Kenneth Lewtas, Tervuren (BE); Roger R. Delme, Bellingen (BE); Oliver J. Georjon, Brussels (BE); Francois-Xavier Gibert, St. Pierre d'Irube (FR); Gerard Marin, Assat (FR); Michael O. Myers, Baton Rouge, LA (US)

(73) Assignees: Exxon Chemical Patents, Inc., Baytown, TX (US); The Dow Chemical Company, Midland, MI (US)

( * ) Notice: Subject to any disclaimer, the term of this patent is extended or adjusted under 35 U.S.C. 154(b) by 0 days.

(21) Appl. No.: 10/312,395

(22) PCT Filed: Jun. 26, 2001

(86) PCT No.: PCT/US01/20671

§ 371 (c)(1),
(2), (4) Date: May 28, 2003

(87) PCT Pub. No.: WO02/00806

PCT Pub. Date: Jan. 3, 2002

(65) Prior Publication Data

US 2004/0250952 A1    Dec. 16, 2004

(51) Int. Cl.
*C08L 25/10* (2006.01)
(52) U.S. Cl. .................. 524/575; 525/576; 525/490; 525/474; 428/355 R
(58) Field of Classification Search ................ 524/575, 524/200, 274, 474, 576, 490; 428/355 BL, 428/355 R
See application file for complete search history.

(56) References Cited

U.S. PATENT DOCUMENTS

| 4,163,765 A | * | 8/1979 | Moczygemba | 525/314 |
| 4,297,451 A | * | 10/1981 | Uraneck et al. | 525/366 |
| 4,418,123 A | * | 11/1983 | Bunnelle et al. | 428/517 |
| 4,500,021 A |   | 2/1985 | Bildusas et al. | |
| 4,619,851 A | * | 10/1986 | Sasaki et al. | 428/41.8 |
| 4,631,314 A |   | 12/1986 | Tung et al. | |
| 4,874,821 A | * | 10/1989 | Agostinis et al. | 525/271 |
| 5,332,613 A | * | 7/1994 | Taylor et al. | 428/152 |
| 5,461,111 A | * | 10/1995 | Modic et al. | 525/71 |
| 5,492,967 A | * | 2/1996 | Djiauw et al. | 525/98 |
| 5,552,492 A | * | 9/1996 | Brandes et al. | 525/314 |
| 5,554,697 A | * | 9/1996 | Van Dijk et al. | 525/314 |
| 5,589,542 A | * | 12/1996 | Himes | 525/98 |
| 5,627,235 A | * | 5/1997 | Himes | 525/98 |
| 5,900,465 A | * | 5/1999 | Nishikawa et al. | 525/98 |
| 5,916,959 A | * | 6/1999 | Lindquist et al. | 524/505 |
| 6,184,285 B1 | * | 2/2001 | Hatfield et al. | 524/505 |
| 6,455,627 B1 | * | 9/2002 | De Keyzer et al. | 524/505 |
| 6,541,553 B1 | * | 4/2003 | Erickson et al. | 521/270 |

OTHER PUBLICATIONS

RU 2100397 to Kondratev et al. (abstract in English).*

* cited by examiner

*Primary Examiner*—David W. Wu
*Assistant Examiner*—Rip A. Lee
(74) *Attorney, Agent, or Firm*—Akin Gump Strauss Hauer & Feld LLP (57) ABSTRACT

Improved adhesives are provided through the use of styrenic tetrablock or pentablock copolymers which have a reduced elastomeric behavior under the die-cutting conditions used in label production.

9 Claims, 8 Drawing Sheets

ADHESIVES WITH IMPROVED DIE-CUTTING PERFORMANCE

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention is directed to elastomer—or rubber-based, pressure-sensitive adhesive compositions particularly useful in label and tape manufacture.

2. Description of the Related Art

During label manufacture, a laminate of a face stock, a pressure-sensitive adhesive layer, and a release liner, such as silicone-coated paper, is passed through an apparatus that converts the laminate into commercially useful labels and label stock. The converting operation processes involve printing, die-cutting, and matrix stripping to leave labels on a release liner, marginal hole punching, perforating, fan folding, guillotining and the like. It is important that the cutting action breaks the face stock and adhesive layer, but does not indent the release liner. Producing a series of labels on a backing sheet involves cutting around the label and removing the material between two labels (the matrix) while leaving the label itself attached to the backing sheet. It is important that the die-cutting machine make a clean break at operating speeds. Adhesives for these applications are formulated to have suitable viscoelastic and adhesive properties so that they can be applied to the release liner or face-stock back and will remain on the label after stripping with the required adhesion. But these properties make the adhesive film difficult to cut or break. They make die-cutting difficult and inconsistent, and cause adhesive strings and deposits on the cutting blade.

Die-cutting involves cutting the laminate through to the release liner face. Other procedures involve cutting completely through the label laminate and include hole punching, perforating, and guillotining, particularly on flat sheets.

The cost of converting a laminate into a finished product, such as a label, is a function of the various processing operations' rates. Line speed depends on whether a printing step is involved. With no printing step, e.g. computer labels, speeds can reach 300 meters/minute. Otherwise, speeds of 50-100 meters/minute are typical. While all laminate layers impact convertibility cost, the adhesive layer can limit convertibility ease. The adhesive layer's viscoelastic nature causes this limitation—its high elasticity prevents it from flowing away from the cut line during die-cutting and also promotes its transfer to cutting blades during cutting. High adhesive elasticity also causes adhesive stringiness, which hinders matrix stripping as the unwanted facing material is removed after die-cutting. High elasticity also promotes adhesive layer reconnection after the layer is severed.

Achieving good convertibility does not necessarily coincide with achieving excellent adhesive performance. Adhesives must be formulated to fit needs. Important adhesive properties include peel adhesion, tack, shear, and viscosity at various temperatures and on various substrates such as polymers, papers, glasses, and steels. Good, general-purpose adhesives may exhibit poor convertibility simply because the adhesive is difficult to cleanly sever. The adhesive may stick to a die or blade. Furthermore, within a speed range, use of a particular adhesive may result in breaking the matrix despite the fact that successful matrix stripping can occur at speeds on either side of the breaking speed. One goal is to provide adhesive systems where the adhesive has good die-cutting performance and where the matrix can be successfully stripped over the entire operating speed range.

Typical label adhesives are produced from acrylic polymer emulsions, which may be tackified by hydrocarbon or natural-resin tackifiers. While these have good die-cutting performance, they require handling large volumes of liquid and subsequent liquid removal. Accordingly, hot melt adhesives would be preferred. At low temperature, acrylic-based adhesives perform poorer than hot-melt systems. Moreover, hot melts can be used at faster line application speeds, over broader temperature ranges can have more aggressive tack, and can be used under humid conditions.

Hot-melt pressure-sensitive adhesive systems are known and consist of tackified thermoplastic elastomers such as styrenic block copolymers. For example, styrenic block copolymers containing polystyrene and polybutadiene blocks and/or polyisoprene blocks are known. These materials are generally available as pure triblocks, (sometimes referred to as SIS and SBS copolymers), and diblocks (sometimes referred to as SI and SB copolymers). The materials are also available as mixtures of diblock and triblock materials (sometimes referred to as SIS+SI and SIS+SB). Examples of these materials include elastomers marketed by Dexco and by Kraton Polymers.

It is known to use diblock/triblock blends as the elastomeric component in hot-melt pressure-sensitive adhesives. It is further known that adhesive properties and viscosity can be controlled by varying the diblock-to-triblock ratio, varying the styrene content, varying the polymer molecular weight, and varying the block molecular weights within the polymers. Examples of materials that have been used are KRATON™ D 1113, containing 16% styrene and 56% diblock; QUINTAC™ 3433, marketed by Nippon Zeon, containing 55% diblock and 17% styrene; VECTOR™ 4114, containing 42% diblock and 17% styrene; and VECTOR™ 4113 containing 20% diblock and 17% styrene. VECTOR™ 4114 and VECTOR™ 4113 are Dexco products. While these materials have good adhesive properties when tackified and can be used in label-production hot melts, they lack optimum die-cutting properties. Furthermore, their low temperature adhesive properties are not optimum.

U.S. Pat. No. 5,663,228 concerns improving label adhesive die-cutability. But the offered solution is complicated, requires two particular block copolymer resins having certain glass-transition temperatures, and requires the choice of a tackifying resin that, when mixed with the two block copolymers, increases the difference between the two block copolymers' glass transition temperatures. Examples of styrenic copolymers that are used in the adhesive mixtures of U.S. Pat. No 5,663,228 are FINAPRENE™ 1205 available from Fina and KRATON™ 1107 available from Kraton Polymers.

U.S. Pat. No. 5,412,032 concerns linear SIS triblock/diblock copolymers that can improve label die-cutting. This is accomplished using block copolymers with a styrene content from 18-24 wt %, a polystyrene block molecular weight from 25,000-35,000, an overall molecular weight from 280,000 up to 520,000, and a coupling efficiency of 20%-40%. The coupling efficiency corresponds to the overall copolymer's triblock content.

U.S. Ser. No. 60/214,308, describes adhesive systems with improved die-cutting performance obtained by optimizing a diblock/triblock blend. We have now found that these improved properties may be obtained with a tetrablock and/or pentablock polymer, thus enabling a single polymerization reaction.

Recognizing that hot-melt, die-cutting performance has to be improved, we analyzed the mechanical and physical aspects of the die-cutting process.

Surprisingly, die-cutting involves relatively low deformation rates and involves pushing the adhesive to the side of the cut line rather than involving a sharp cutting action. In successful die-cutting, the adhesive must creep when subjected to knife action, flow away from the cut point, and not reform over the cut line.

In light of the above, we have found that, for good die-cutting, a styrenic, tetra or pentablock, copolymer adhesives should fulfill the following criteria:

G' at room temperature monotonically decreasing with frequency at frequencies below the glass transition region (typically <10 rad/s), down to a constant storage modulus plateau at the lowest frequencies. The storage modulus plateau is preferably lower than 10000 Pa, more preferably lower than 7000 Pa and most preferably lower than 4000 Pa.

G' should intersect a value of 10000 Pa at a frequency preferably higher 20 than 0.001 rad/s; more preferably higher than 0.005 rad/s; and most preferably higher than 0.01 rad/s.

The loss factor Tan δ (defined as the ratio G"/G') is preferably between 0.2 and 1; more preferably between 0.4 and 1; and most preferably between 0.6 and 1, at the frequency at which the storage modulus intersects a value of 10,000 Pa when measured at 20° C.

Altogether, both the surprisingly low deformations rates involved in the die-cutting process, as well as the required adhesive flow during die-cutting, explains why water-based acrylic adhesives behave better than their triblock (e.g., SBS or SIS) counterparts. These two systems provide good examples of good and bad die-cutting behavior respectively.

Viscoelastic behavior of hot-melt adhesives at a given temperature is conveniently captured by the two dynamic moduli known as G' and G": the loss modulus G" indicating the viscous behavior, and the storage modulus G' indicating elastic behavior. The ratio of G" and G' is known as the loss factor Tangent delta (Tan δ).

The finding that the cutting mechanism pushes the adhesive away from the cut line rather than sharply cutting it, calls for a less elastic adhesive so that it permanently flows away from the cut line. Emphasis should be put on the low frequency behavior because of the knife's surprisingly small vertical velocity during die-cutting.

Figure 1:
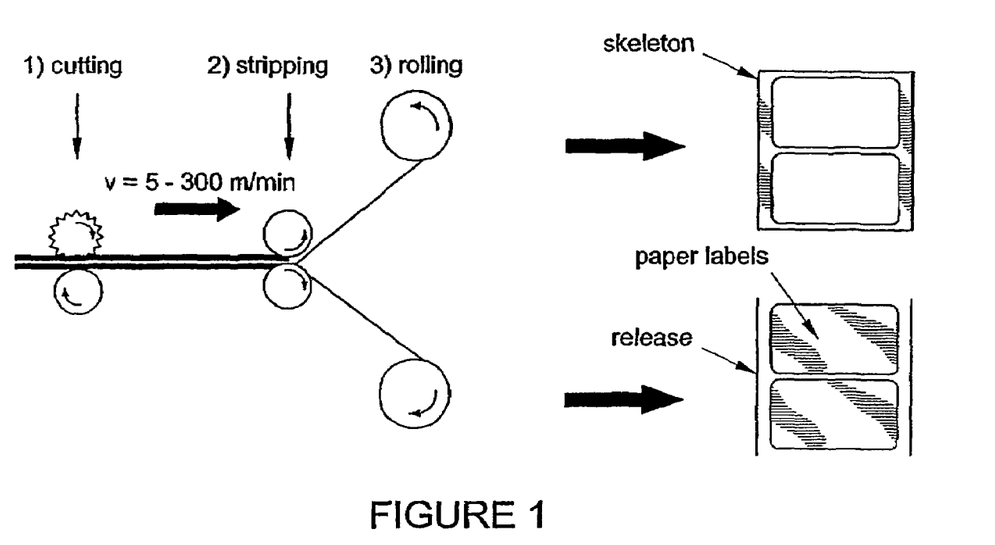
FIG. 1 illustrates a typical die-cutting process.
Figure 2:
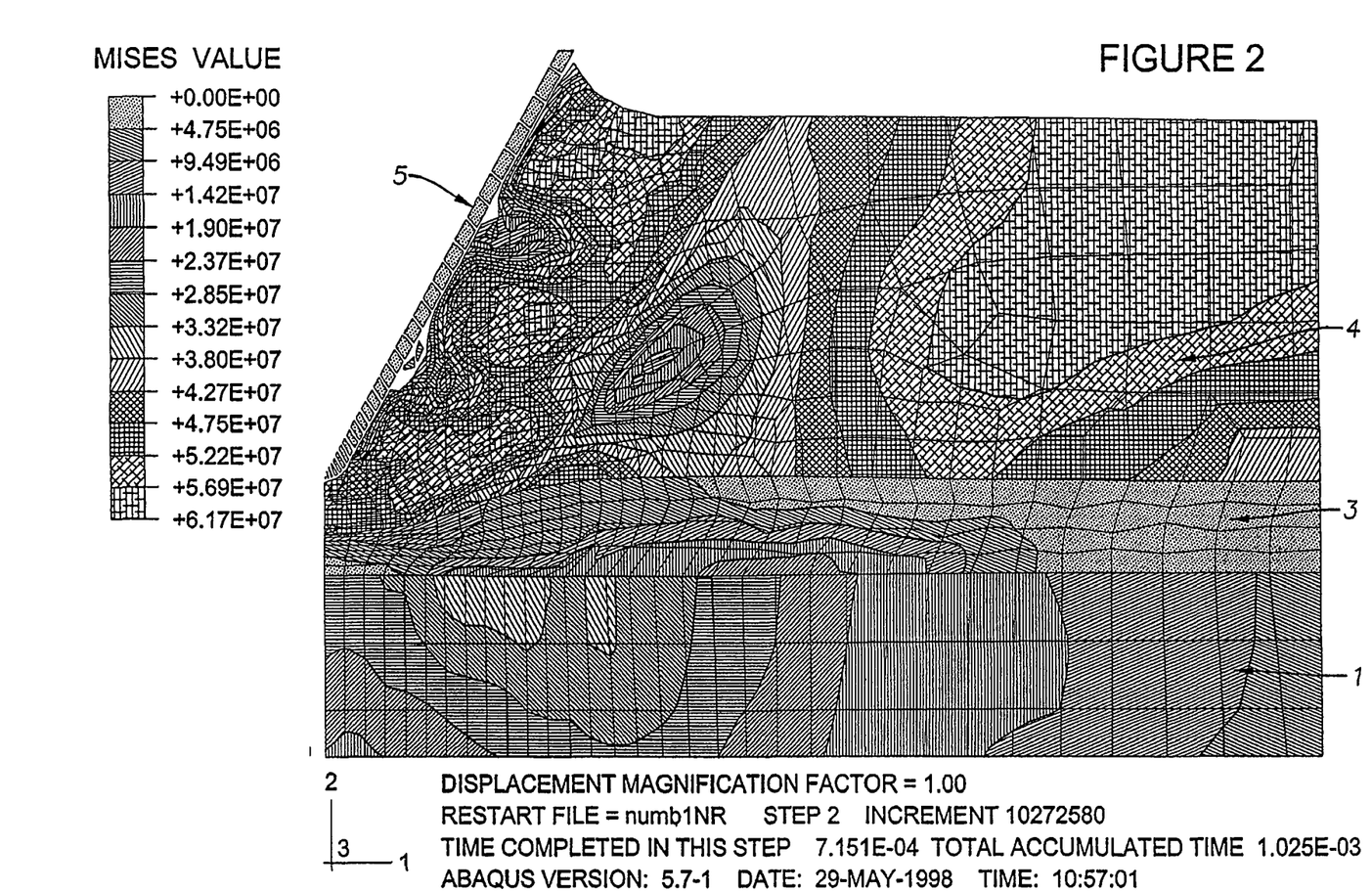
FIG. 2 simulates die-cutting: 1 is the paper, 2 is the release coating, 3 is the adhesive layer, 4 is the label stock, and 5 is the die-cutting blade that cuts in an anti-clockwise direction. The simulation shows how, as the knife crushes and breaks through the paper, the adhesive under the cut line is pushed away but does not cut. Accordingly, the more readily the adhesive flows and the less elastic it is the easier and cleaner the cut will be.
Figure 3:
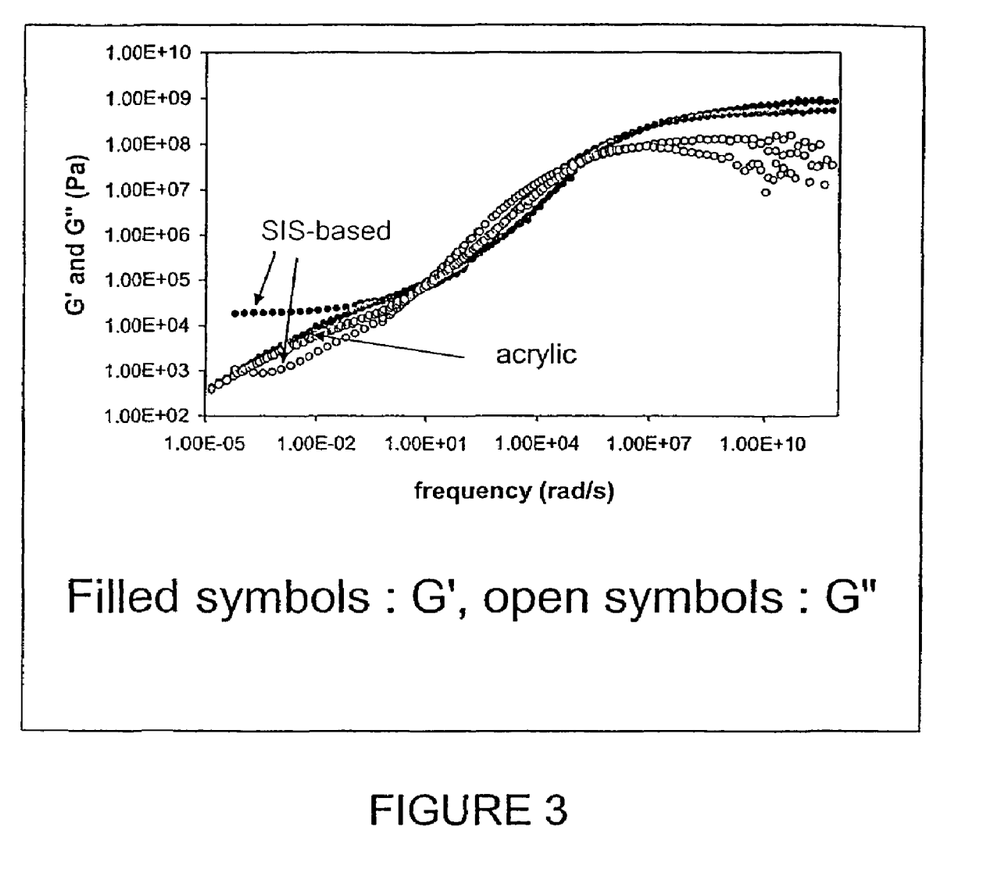
FIG. 3 plots G' and G" vs. frequency.

Dynamic mechanical analysis of acrylic systems shows indeed that the storage modulus G' continuously decreases with frequency, indicating no constant plateau at low frequencies. At the same time, there is a relatively high loss modulus G" at low frequency, essentially overlaying G'. This amplifies the adhesive's tendency to permanently deform and flow under stress, as shown in FIG. 3. On the other hand, similar analysis of pure triblock adhesives shows a constant and relatively high plateau modulus G' (>10000 Pa) in the low frequency region, much higher than the loss modulus G". This reflects the adhesive's undesirable tendency to recover from deformation during die-cutting.

BRIEF SUMMARY OF THE INVENTION

In part, this invention provides an adhesive comprising a tackified styrenic block copolymer in which the copolymer comprises a tetrablock and/or a pentablock copolymer having a styrene content of from 10-27 wt %. The adhesive achieves clean, adhesive-layer rupture when the face stock is cut through to the laminate release liner. At the same time, the adhesive provides excellent adhesive properties at both ambient and reduced temperatures. It is particularly suitable for use in labels and may be applied as a hot melt.

The use of styrenic tetrablock and/or pentablock copolymer rubber in label adhesives leads to improved die-cutting performance. This allows a single polymer to replace blends. Furthermore, the use of these tetrablock and/or pentablock copolymers provides adhesives with improved low temperature performance. We have now found that some of these copolymers provide the desired combination of die-cutting performance and adhesive properties. This accordingly enables improved, hot-melt-adhesive production for use in tape and label manufacture.

DETAILED DESCRIPTION OF THE INVENTION

The tetrablock and/or pentablock copolymers used in the present invention are preferably composed of styrenic blocks (S), polyisoprene blocks (I) and/or polybutadiene blocks (B). Examples of useful block copolymers include SISI, SISB, SBSB and SISB tetrablocks and ISISI, ISISB, BSISB, BSBSB and BSBSI pentablocks.

The tetrablock and/or pentablock copolymers are used on their own or mixed with other polymers, particularly other styrenic block copolymers such as diblock and triblock copolymers.

The block copolymers contain styrene and butadiene and/or isoprene. To get good die-cutting performance, the polymers' vinyl aromatic hydrocarbon content (generally styrene) should be controlled. Similarly, some embodiments have 10 or more wt % vinyl aromatic content; yet others have 15 or more wt % vinyl aromatic content. Vinyl aromatic hydrocarbon content should be at or below 27, alternatively at or below 20, or at or below 18 wt %.

Molecular weights are number average molecular weights and are measured in g/mole by Gel Permeation Chromatography (GPC), where the GPC system has been appropriately calibrated, for example, by using standards of similar polymers with known molecular weight.

Some block copolymer embodiments have the following properties:

1. an overall minimum styrene content greater than 10, alternatively 12 wt %;
2. an overall maximum styrene content of 27, alternatively 20 wt %; and
3. a minimum tetrablock and/or pentablock content of at least 40, alternatively 70, wt % based on the total amount of block copolymer present.

Some embodiments of invention rubbers are 100% tetrablock and/or pentablock. Some embodiments select conditions to cause any present diblock and/or triblock polymer to contain 16-20% styrene.

The styrenic tetrablock and/or pentablock copolymers used in some embodiments have number average molecular weight of from 45,000-250,000 alternatively 100,000-170,000. The required properties of the invention rubbers control the selection of the copolymer blocks molecular weights. The styrenic blocks have a molecular weight of at least 4000, alternatively at least 6000 or 8000 g/mole, and at most 35,000, alternatively 20,000, g/mole. Typically, styrenic block molecular weights of at least 4000 provide suitable holding power, shear properties, and cohesive strength. Also, molecular weights below 35,000 typically give a sufficiently pliable adhesive with suitable pressure sensitivity. In some embodiments, the butadiene and/or isoprene blocks have a molecular weight of at least 10,000 g/mole, and at most 200,000, alternatively at least 15,000 and at most 150,000, or at least 20,000 and at most 80,000 g/mole. Unsaturated diene blocks with molecular weight greater than 10,000 typically provide stronger polymers with good shear properties. Unsaturated diene blocks with molecular weight under 200,000 are typically processed more easily. Where SISI, SISB, SBSI or SBSB polymers are used, the molecular weight of the two unsaturated diene blocks can be varied. Polymers in which the internal block has Mw less than the end block are particularly useful. Some invention copolymers have an internal unsaturated block with a molecular weight in the range 20,000 to 70,000 alternatively 25,000 to 50,000 and the external block has a molecular weight above 40,000, alternatively above 60,000, when it is a B block, and above 55,000, alternatively above 75,000, when it is an I block.

Where the rubber contains other block polymers, these are preferably SI block polymers. If triblock material is present, some embodiments select an Mw of at least 50,000. Alternatively, the triblock has Mw of at least 100,000, g/mole and at most 300,000, alternatively 180,000. Further, the diblock material's Mw, particularly an SI diblock material, is at least 60,000, alternatively 70,000 or 80,000 g/mole and at most 150,000, alternatively 140,000 or 110,000 g/mole. In some embodiments, the SI block copolymer should comprise at least 60 wt %, alternatively 70 percent, or 75 weight percent of the total copolymer, and at most 85 80 wt %, alternatively 80 wt % of the total copolymer. Where the diblock material is an SB material, some embodiments have Mw between 50,000 and 150,000, alternatively 65,000 to 110,000 or 70,000 to 90,000 g/mole. Some embodiments have SB block copolymer comprising at least 45 or 60 wt % total block copolymer, and at most 80 or 75 wt % of the total block copolymer.

For purposes of this specification, molecular weight means peak molecular weight as measured by Gel Permeation Chromatography (GPC—sometimes known as size exclusion chromatography) calibrated on polystyrene. Commercially-available polystyrene calibration standards were used, and the molecular weights of copolymers were corrected according to Runyon et al, *J. Applied Polymer Science*, Vol. 13 Page 359 (1969) and Tung, L H J, *Applied Polymer Science*, Vol. 24 Page 953 (1979).

GPC measurements used a Hewlett-Packard Model 1090 chromatograph equipped with a 1047A refractive index detector and four 300 mm×7.5 mm Polymer Laboratories SEC columns packed with five micron particles. These consist of two columns with $10^5$ angstrom pore size, one with $10^4$ angstrom pore size, and one with mixed pore sizes. The carrier solvent was HPLC-grade tetrahydrofuran (THF) with a flow of 1 ml/min. Column and detector temperatures were 40° C., and run time was 45 minutes.

The following rheological properties are also desirable in these polymer systems. $G^1$ should monotonically decrease with frequency at frequencies below the $T_g$ region. The loss factor for Tan $\delta$ is preferably between 0.2 and 1, and the storage plateau modulus should be substantially constant at low frequencies. These properties are illustrated in FIG. 3, which is a log/log plot of $G^1$ and $G^{11}$ for adhesive systems based on acrylics and triblock copolymers. The plot shows how, for acrylics, G' and G" are substantially overlaid, whereas for SIS-triblock-based systems at low frequency, G' and G" diverge.

The tetra and/or pentablock copolymers are prepared by any suitable polymerization technique such as free-radical polymerization or Zeigler-type catalysis. Polymerization systems in which the blocks are sequentially produced are preferred to those in which two or more preformed blocks are coupled to each other. Sequential polymer development enables greater block molecular weight variation, which is particularly useful for polymers where internal-polydiene-block molecular weight is considerably lower than external-polydiene-block molecular weight.

A particular problem of some previously proposed systems, which use rubber mixtures containing different blocks, such as, for example, SIS triblock and SB diblock mixtures, is that the rubbers lack miscibility over broad temperature ranges. This adversely affects adhesive properties particularly at low temperatures This problem is considerably reduced and the adhesive properties improved, if the different blocks are within the same molecule as with an SISB tetrablock. These molecules are more easily built up sequentially rather than by coupling pre-formed diblock materials.

Inventive adhesive tackifier additives are chosen based on the particular rubber that is used. But most tackifiers may be used. Preferred tackifiers are resins from aliphatic petroleum derivative streams containing 5-or-6-carbon atom dienes and mono-olefins. The tackifiers range from materials that are normally liquid at room temperature to those that are normally solid at room temperature. The resins typically contain 40 weight percent or more of polymerized dienes. The dienes are typically piperylene and/or isoprene. Useful tackifiers include ESCOREZ™ 1310 LC manufactured by Exxon Mobil Chemical softening point 91° C., PICCO-TAC™ 95 manufactured by Hercules, and the WING-TACK™ resin family manufactured by Goodyear (with the numerical designation being the softening point) such as WINGTACK™ 95, which is a solid resin having a softening point of about 95° C., and WINGTACK™ 10, which is a liquid resin having a softening point of about 10° C.

Other suitable tackifiers include hydrogenated or non-hydrogenated resins, such as aromatic/aliphatic resins, such as ECR 373 or ESCOREZ™ 2520 manufactured by ExxonMobil Chemical. Hydrogenated polycyclic resins (typically dicyclopentadiene resins such as ESCOREZ™ 5300, 5320, 5340, and 5380 manufactured by ExxonMobil Chemical) and the like may also be used. Hydrogenated, polycyclic aromatic modified resins, such as ESCOREZ™ 5690, 5600, and 5620, manufactured by ExxonMobil Chemical, may also be used. Hydrogenated aromatic resins in which a substantial portion, if not all, of the benzene rings are converted to cyclohexane rings (for example, the REGALREZ™ family of resins manufactured by Hercules such as REGALREZ™ 1018, 1033, 1065, 1078, and 1126 and REGALITE™ R-100, and the ARKON™ family of resins from Arakawa Chemical such as ARKON™ P-85, P-100, P-115 and P-125) may also be used.

Rosin esters, polyterpenes, and other tackifiers, which are compatible with the polyisoprene and polybutadiene phases and to some degree with the polystyrene end blocks, can also be added. Other additives include plasticizer oils such as SHELLFLEX™ 371, manufactured by Shell, and KAYDOL™ mineral oil, manufactured by Witco, which are soluble in both the polyisoprene and polybutadiene phases.

The tackifier may be present from 50% by weight, alternatively 60%, 30 based on the total weight of tackifier and copolymers. It may be present at up to 80% by weight, alternatively up to 70% by weight. Conversely, the block copolymers are present from 20%, alternatively 30%, by weight based on the weight of the tackifier and the copolymers and up to 50%, alternatively to 45%, by weight based on the weight of the tackifier and the copolymers. In some embodiments, the resin additive is preferably a mixture of a normally solid tackifier such as ESCOREZ™ 1310 LC and a normally liquid tackifier such as WINGTACK™ 10 or a plasticizer oil such as SHELLFLEX™ 371.

Tackifiers, also known as hydrocarbon or petroleum resins, are well known and are generally produced by Friedel-Crafts or thermal polymerization of various feeds, which may be pure monomer feeds or refinery streams containing mixtures of various unsaturated materials. Generally speaking, the purer the feed the easier to polymerize. For example, pure styrene, pure α-methyl styrene and these mixtures are easier to polymerize than a $C_8/C_9$ refinery stream. Similarly, pure or concentrated piperylene is easier to polymerize than $C_4$ to $C_6$ refinery streams. But these pure monomers are more expensive to produce than the refinery streams, which are often large volume refining byproducts.

Aliphatic hydrocarbon resins can be prepared by cationic polymerization of a cracked petroleum feed containing $C_4$, $C_5$, and $C_6$ paraffins, olefins, and diolefins also referred to as "$C_5$ monomers". These monomer streams are comprised of cationically polymerizable monomers such as butadiene, 1,3-pentadiene (piperylene) along with cyclopentene, pentene, 2-methyl-2-butene, 2-methyl-2-pentene, isoprene, cyclopentadiene, and dicyclopentadiene. The refining streams are purified usually by fractionation and impurity removal to obtain these feeds.

Polymerizations are catalyzed using Friedel-Crafts catalysts such as unsupported Lewis acids (e.g., boron trifluoride ($BF_3$), complexes of boron trifluoride, aluminum trichloride ($AlCl_3$), or alkyl-aluminum halides, particularly chloride). In addition to the reactive components, non-polymerizable components in the feed include saturated hydrocarbons, which can be co-distilled with the unsaturated components such as pentane, cyclopentane, or 2-methylpentane. This monomer feed can be co-polymerized with other $C_4$ or $C_5$ olefins or dimers. The feed should be purified (typically by fractionation) to remove unsaturated materials that adversely affect the polymerization reaction or give undesirable color to the final resin (for example isoprene). Generally, $C_5$ aliphatic hydrocarbon resins are synthesized using a piperylene concentrate stream that is fractionation-enriched to increase the piperylene content and to reduce the difficult-to-polymerize olefin and diolefin content Typically, the feedstream includes at least 20 wt %, alternatively 30 wt %, or 50 wt %, monomer and up to 80 wt %, alternatively 70 wt %, or 30 wt %, solvent. The solvent may be aromatic or aliphatic. Mixtures of aromatic and aliphatic solvents may also be used and it also may be recycled. The solvent may be a non-polymerizable feed component.

The feedstream may include at least $C_4$ to $C_6$ monomers, from which cyclopentadiene and methylcyclopentadiene components may be removed by heating between 100° C. and 160° C. and fractionally distilling. The monomers may include at least one of isobutylene, butadiene, 2-methyl-2-butene, 1-pentene, 2-methyl-1-pentene, 2-methyl-2-pentene, 2-pentene, cyclopentene, isoprene, cyclohexene, 1,3-pentadiene, 1,4-pentadiene, isoprene, 1,3-hexadiene, 1,4-hexadiene, cyclopentadiene, and dicyclopentadiene.

In accordance with another aspect, the feedstream can include at least 30 wt %, alternatively 50 wt %, of $C_5$ monomers, as described above and at least 5 wt %, alternatively 15 wt % of a co-feed including at least one of pure monomer, $C_9$ monomers, and terpenes. Likewise, the feedstream can include up to 95 wt %, 20 alternatively up to 85 wt % of $C_5$ monomers, as described above and up to 70 wt %, alternatively up to 50 wt %, of a co-feed including at least one of pure monomer, $C_9$ monomers, and terpenes.

The feed may also contain aromatic olefins such as styrene, indene, α-methylstyrene, β-methylstyrene, indene, substituted indenes, such as methylindenes, vinyl toluenes, and their derivatives. The aromatic olefins are typically present at levels of at least 1 wt %, and at levels up to 50 wt %, alternatively up to 30 wt %,or 10 wt %.

Polymerizations may be continuous or batch processes. A batch process reaction time is usually at least 30 minutes, alternatively 60 minutes, and no greater than 8 hours, alternatively 4 hours. Polymerization temperatures are at least −50° C. to 150° C., alternatively −20° C. to 100° C. Reaction temperature significantly affects resin properties. Higher-molecular-weight and high-softening-point resins are prepared at lower reaction temperatures. Polymerization may be stopped by removing the catalyst from the hydrocarbon resin, for example, by filtration. The hydrocarbon resin may be removed from a fixed bed reactor, which includes the catalyst. The hydrocarbon resin may be stripped to remove unreacted monomers, solvents, and low-molecular-weight oligomers. The unreacted monomers, solvents, and low-molecular-weight oligomers may be recycled.

The monomer feed can be co-polymerized with $C_4$ or $C_5$ olefin or dimers as chain transfer agents. Up to 40 wt %, alternatively up to 20 wt %, of chain transfer agents may be added to obtain resins with lower molecular weight and narrower molecular weight distributions than can be prepared using monomers alone. Chain transfer agents terminate polymer chain growth such that polymer initiation sites regenerate. Components that behave as chain transfer agents in these reactions include but are not limited to isobutylene, 2-methyl-1-butene, 2-methyl-2-butene, or dimers or oligomers of these species. The chain transfer agent can be added to the reaction in pure form or diluted in a solvent.

Typically, aromatic solvents are used, such as toluene, xylenes, or light aromatic petroleum solvents. These solvents can be used fresh or recycled from the process. The solvents generally contain less than 200 ppm water, alternatively less than 100, or less than 50 ppm water.

Typically, the resulting resin has a number average molecular weight (Mn) of at least 400, a weight average molecular weight (Mw) of at least 500, a Z average molecular weight (Mz) of at least 700, and a polydispersity (PD) as measured by Mw/Mn of at least 1.5 where Mn, Mw, and Mz are determined by Gel Permeation chromatography. Similarly, the resin has a number average molecular weight (Mn) up to 2000, a weight average molecular weight (Mw) of up to 3500, a Z average molecular weight (Mz) of up to 15,000 and a polydispersity (PD) as measured by Mw/Mn up to 4.

Where hydrogenated resins are used, the hydrogenation may be carried out via molten-resin-or resin-solution-based processes by either batchwise or, more commonly, continuous processes. Supported monometallic and bimetallic catalysts based on Group-6, -8, -9, -10 or -11 elements are typically used for hydrocarbon resin hydrogenation. Catalysts such as supported nickel (for example, nickel on alumina, nickel on charcoal, nickel on silica, nickel on kieselguhr, etc), supported palladium (for example, palladium on silica, palladium on charcoal, palladium on magnesium oxide, etc) and supported copper and/or zinc (for example copper chromite on copper and/or manganese oxide, copper and zinc on alumina, etc) are good hydrogenation catalysts. The support material typically consists of porous inorganic refractory oxides such as silica, magnesia, silicamagnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially homogeneous mixtures. Among the useful support materials in the present invention are the supports disclosed in the U.S. Pat. Nos. 4,686,030, 4,846,961, 4,500,424, and 4,849,093. Some embodiments select alumina, silica, carbon, MgO, $TiO_2$, $ZrO_2$, $FeO_3$ or their mixtures as supports.

Any of the known processes for catalytically hydrogenating hydrocarbon resins can be used, particularly the processes of U.S. Pat. Nos. 5,171,793, 4,629,766, 5,502,104 and U.S. Pat. Nos. 4,328,090 and WO 95/12623. Generic hydrogenation conditions include reaction temperatures of 100° C.-350° C. and hydrogen pressures of 5 atmospheres (506 kpa)-300 atmospheres (30390 kPa), for example, 10 to 275 atm. (1013 kPa to 27579 kPa). Some embodiments select hydrogenation temperature in the range 180° C. to 320° C. These or other embodiments select pressure of 15195 kPa to 20260 kPa hydrogen. The hydrogen-to-feed volume ratio to the reactor under standard conditions (25° C., 1 atm (101 kPa) pressure) typically can range from 20-200. For the production of water-white resins, 100-200 is selected.

Another suitable process for resin hydrogenation is described in EP 0082726. This document describes hydrogenation of a catalytic or thermal petroleum resin using nickel-tungsten catalyst on a γ-alumina support where the hydrogen pressure is $1.47 \times 10^7$–$1.96 \times 10^7$ Pa and the temperature is 250-330° C. Thermal hydrogenation is usually performed at 160-320° C., at a pressure of $9.8 \times 10^5$ to $11.7 \times 10^5$ Pa and typically for 1.5-4 hours. hydrogenation, the reactor mixture may be flashed and further separated to recover the resin. Steam distillation may be used to eliminate oligomers, preferably without exceeding 325° C.

Some embodiments select catalysts comprising nickel and/or cobalt on one or more of molybdenum, tungsten, alumina, or silica supports. These or other embodiments select 2 to 10 wt % of nickel oxide and/or cobalt oxide on the support. After preparation, the support contains 5-25 wt % tungsten or molybdenum oxide. Alternatively, the catalyst contains 4-7 wt % nickel oxide and 18-22 wt % tungsten oxide. This process and suitable catalysts are described in greater detail in U.S. Pat. No. 5,820,749.

In another embodiment, the hydrogenation may be carried out using the process and catalysts described in U.S. Pat. No. 4,629,766. In particular, nickel-tungsten catalysts on γ-alumina are used.

While the pressure-sensitive invention adhesive formulations exhibit excellent low and ambient temperature performance, as well as good die cutting performance, they may also enhance elevated-temperature performance. This may be accomplished by cross-linking such as with electron beam (EB) and ultraviolet (UV) radiation and chemical cross-linking techniques. If employed, tackifying additives should be substantially saturated so that all of the cure energy goes into cross-linking the adhesives' elastomeric components.

The adhesive formulations may also contain well-known additives such as anti-block, anti-static, antioxidants, UV stabilizers, neutralizers, lubricants, surfactants and/or nucleating agents. These can include silicon dioxide, titanium dioxide, polydimethylsiloxane, talc, dyes, wax, calcium stearate, calcium carbonate, carbon black, and glass beads.

Invention adhesives may be used as pressure-sensitive, hot-melt or contact adhesives and used in applications such as tapes, labels, paper impregnation, hot-melt adhesives, including woodworking, packaging, bookbinding or disposables, sealants, rubber compounds, pipe wrapping, carpet backing, contact adhesives, road-marking or tire construction. They are particularly useful as hot-melt pressure-sensitive adhesives used for tapes and labels where they impart improved die-cutting performance.

The following examples illustrate, but do not limit the invention.

Hot-melt pressure-sensitive adhesives were prepared by mixing the block copolymers with the tackifying resins in a 300 ml laboratory z blade mixer, at 145° C. A small amount of phenolic antioxidant was blended in to prevent the adhesive's degradation during blending. The total mixing time was about 70 minutes.

ESCOREZ™ 1310 and ECR 373 from ExxonMobil Chemical and WINGTACK™ 10 from Goodyear were used as tackifiers.

The final blend viscosity was measured with a Brookfield viscosimeter according to a procedure based on ASTM D 3236-88.

The pressure sensitive adhesives were applied to a silicone coater paper at a coating weight of about 20 g/m², using an Acumeter laboratory coater with a slot die for the molten adhesive formulation at 165° C. Lamination was done according to industry practice by transfer coating from a silicone coater paper release substrate to a 80 g/m² vellum paper frontal substrate.

The adhesive performances were evaluated according to the following test methods published by FINAT, P.O. Box 85612 NL-2508 CH The Hague.
FTM 1 for the peel adhesion at 180 degree
FTM 9 for the loop tack measurements
FTM 7 for the shear resistance Migration was evaluated by comparing the whiteness of the paper frontal substrate after aging at 60 and 70° C. for one and two weeks. Whiteness was evaluated with a Hunterlab spectrophotometer.

Dynamic Theological properties at 20° C. were determined on RDAII and SR-500 instruments manufactured by Rheometric Scientific, Piscataway, N.J. The former gives access to frequencies-between $10^{-2}$ to 100 rad.s$^{-1}$ and temperatures lower than 20° C. (down to −70° C.) to reach the glassy region obtained at higher frequencies. The SR-500 instrument, which covers a frequency range between $10^{-5}$ to 100 rad.s$^{-1}$ at room temperature was used for the terminal zone (lower frequencies). We used a plate-plate geometry for all experiments. The diameter of the plate-plate fixture (from 25 mm to 5 mm) decreases as temperature decreases to maintain the actual rheometer torque between measurable. limits. Frequency sweeps were carried out at deformation levels well within the linear viscoelastic region. To broaden the accessible experimental frequencies range, time-temperature superposition was applied with care. Measurements in frequencies from $1 \cdot 10^{-4}$ to $1 \cdot 10^{+2}$ were made at 20° C. whereas at higher frequencies, lower temperatures were used, and the measurements were extrapolated to 20° C. This was done because phase-structure changes may occur at high temperature.

To ensure that experiments were conducted on bubble-free specimens, samples were degassed overnight under primary vacuum at about 90° C. Disks of adequate diameter were then compression molded, at a temperature systematically lower than the mixing temperature (145° C.).

COMPARATIVE EXAMPLE 1

A hot melt formulation was prepared with 31% of a pure triblock copolymer, 27% of Wingtack 10, and 42% of Escorez 1310. The resulting hot melt showed the following characteristics.

Figure 4:
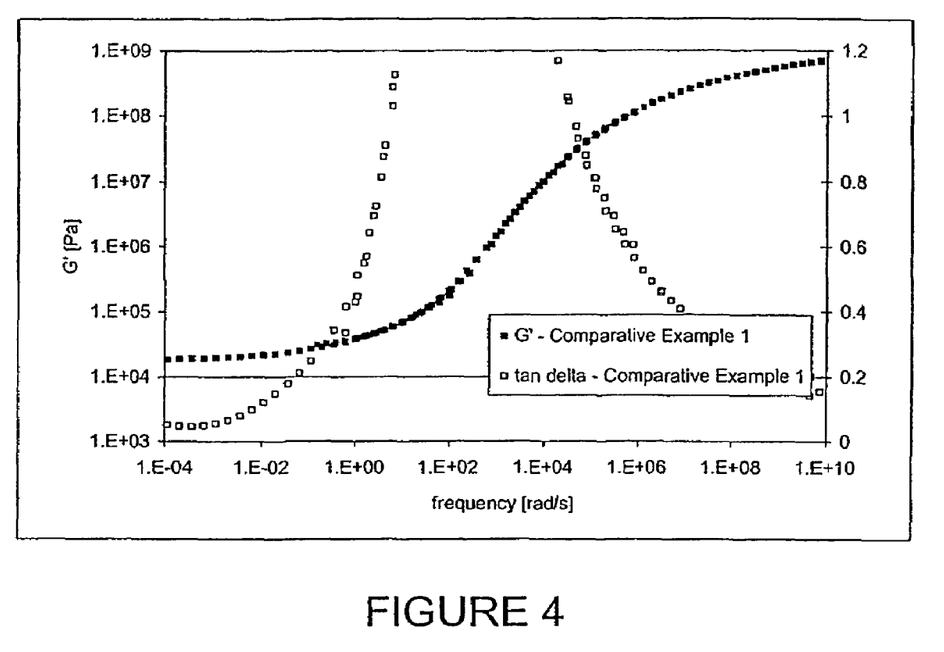
FIG. 4 plots G' and Tan δ vs. frequency for Comparative Example 1.

| | |
|---|---|
| Brookfield Viscosity (175° C. - mPa · s) | 7500 |
| 180° peel strength - N/25 mm | |
| Room temperature - glass | 35.0 cf |
| 3° C. - glass | 26.5 cf |
| Room temperature - Polyethylene | 20.5 cf |
| 3° C. - Polythylene | 19.0 cf |
| Loop Tack - N | |
| glass at room temperature | 25 cf |
| glass at 3° C. | 16.5 pt |
| Loop Tack - N | |
| Polyethylene at room temperature | 16.0 |
| Polyethylene at 3° C. | 4.2 j |
| Shear - room temperature - hours | |
| Steel - 25 * 25 mm - 1 kg | >150 |
| Migration - % reflection | |
| 1 week 60° C. | 90 |
| 1 week 70° C. | 85.5 | pt means paper tear
cf means cohesive failure
af means adhesive failure
j means jerking The dynamic rheological properties are shown in FIG. 4. As can be seen, the plateau modulus at low frequencies is 18 000 Pa, i.e.>10 000 Pa.

The hot melt adhesive showed poor die-cutting behavior.

EXAMPLE 2

A SISI tetrablock copolymer in which the blocks were of molecular weight 12,400; 60,000; 12,400 and 70,000 respectively having an overall styrene content of 16 wt % was used in a hot melt formulation containing 31 wt % of polymer, 27 wt % of Wingtack 10, and 42 wt % of Escorez 1310 to which was added 0.4 wt % of Irganox 1076. The resulting hot melt showed the following characteristics:

| | |
|---|---|
| Brookfield Viscosity (175° C. - mPa · s) | 9800 |
| 180° peel strength - N/25 mm | |
| Room temperature - glass | 33.3 pt |
| 3° C. - glass | 22.8 pt |
| Room temperature - Polyethylene | 24.8 pt |
| 3° C. - Polyethylene | 19.8 pt |
| Loop Tack - N | |
| glass at room temperature | 29.9 cf |
| glass at 3° C. | 14.0 pt |
| Loop Tack - N | |
| Polyethelyne at room temperature | 18.9 af |
| Polyethylene at 3° C. | 12.7 pt |
| Shear - room temperature - hours | |
| Steel - 25 * 25 mm - 1 kg | 42.1 |
| Migration - % reflection | |
| 1 week 60° C. | 87.3 |
| 1 week 70° C. | 81.9 | pt means paper tear
cf means cohesive failure
af means adhesive failure

Figure 5:
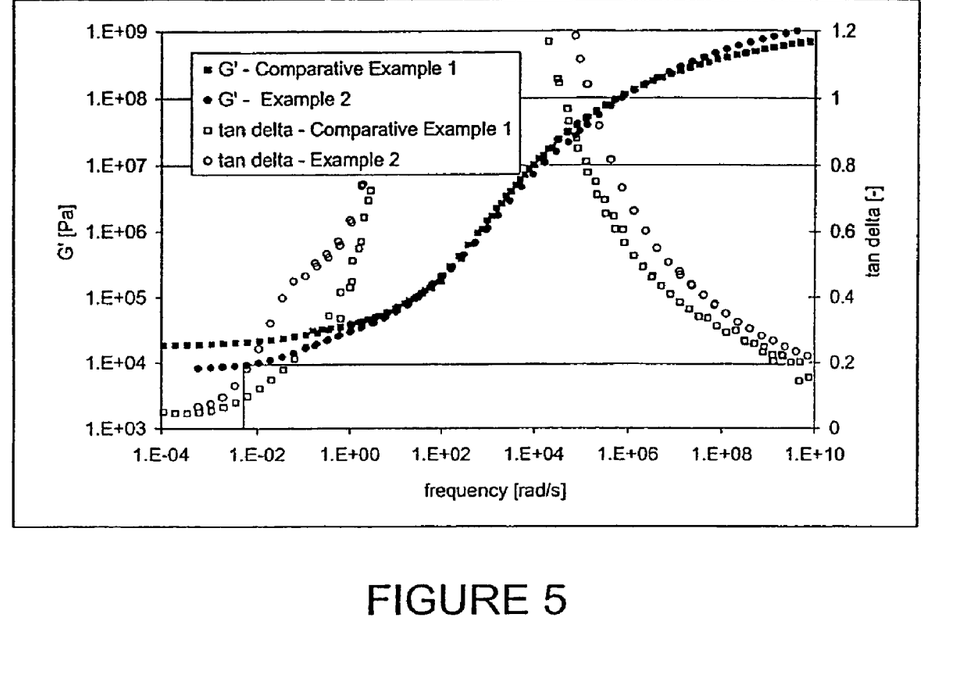
FIG. 5 plots G' and Tan δ for Example 2 overlaid with those of Comparative Example 1.

The dynamic rheological properties are shown FIG. 5, where they are compared with those of Comparative Example 1. As can be seen, the plateau modulus at low frequencies is 8 000 Pa, lower than for the Comparative Example. G' intersects a value of 10 000 Pa at a frequency of 0.006 rad/s, where Tan δ equals 0.2.

This reduced elastic behavior (lower plateau modulus, higher loss factor. Tan δ) indicates that this polymer will be beneficial in die-cutting operations.

EXAMPLE 3

A SISI tetrablock copolymer in which the blocks were of molecular weight 10,330-30,450-10,330-91,400 respectively having an overall styrene content of 14 wt %. A hot melt formulation has been prepared with 41% of above polymer, 18% of Wingtack 10, and 41% of Escorez 1310 to which was added 0.4% of Irganox 1076. The resulting hot melt showed the following characteristics.

| | |
|---|---|
| Brookfield Viscosity (175° C. - mPa · s) | 26600 |
| 180° peel strength - N/25 mm | |
| Room temperature - glass | 27.3 cf + pt |
| 3° C. - glass | 25.3 pt |
| Room temperature - Polyethylene | 25.0 cf + pt |
| 3° C. - Polythylene | 22 af |
| Loop Tack - N | |
| glass at room temperature | 37.8 cf |
| glass at 3° C. | 16.6 pt |

-continued

| Loop Tack - N | |
|---|---|
| Polyethylene at room temperature | 19.1 af |
| Polyethylene at 3° C. | 5.3 j |
| Shear - room temperature - hours | |
| Steel - 25 * 25 mm - 1 kg | 31-cf |
| Migration - % reflection | |
| 1 week 60° C. | 90 |
| 2 weeks 60° C. | 89 |
| 1 week 70° C. | 81 |
| 2 weeks 70° C. | 78 | j means jerking

Figure 6:
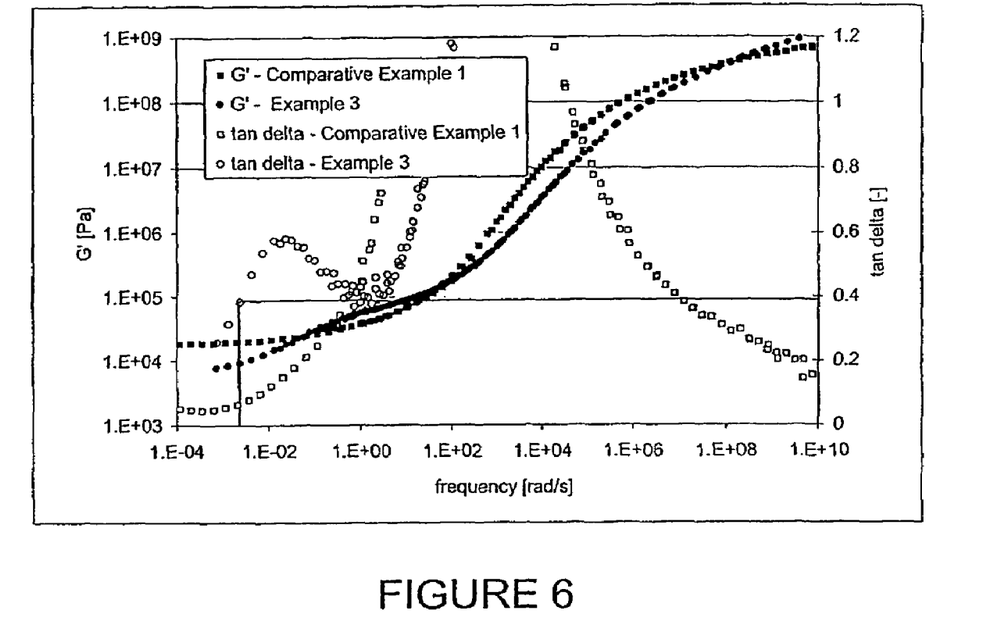
FIG. 6 plots G' and Tan δ for Example 3 overlaid with those of Comparative Example 1.

The dynamic rheological properties of the formulation are shown FIG. 6, where they are compared with those of Comparative Example 1. As can be seen, the plateau modulus at low frequencies is 8 000 Pa, lower than for the Comparative Example. G' intersects a value of 10 000 Pa at a frequency of 0.003 rad/s, where Tan δ equals 0.4.

This data indicates that the use of this tetrablock polymer will be beneficial in die-cutting operations.

EXAMPLE 4

A SISB tetrablock copolymer in which the blocks were of weight-average molecular weight 11,300; 61,000; 11,300 and 42,500 respectively having an overall styrene content of 17 wt % was used. A hot melt formulation has been prepared with 31% of this polymer, 27% of Wingtack 10, and 42% of ECR 373 to which was added 0.4% of Irganox 1076. The resulting hot melt showed the following characteristics.

| Brookfield Viscosity (175° C. - mPa · s) | 1000 |
|---|---|
| 180° peel strength - N/25 mm | |
| Room temperature - glass | 35.5 pt |
| 3° C. - glass | 24.2 pt |
| Room temperature - Polyethylene | 23.5 af |
| 3° C. - Polythylene | 21.8 pt |
| Loop Tack - N | |
| glass at room temperature | 26 cf |
| glass at 3° C. | 20.8 pt |
| Loop Tack - N | |
| Polyethylene at room temperature | 18.1 af |
| Polyethylene at 3° C. | 13.3 pt |
| Shear - room temperature - hours | |
| Steel - 25 * 25 mm - 1 kg | 52.7 cf |
| Migration - % reflection | |
| 1 week 60° C. | 58.1 |
| 2 weeks 60° C. | 52.2 |
| 1 week 70° C. | 47.2 |
| | 44.4 |

Figure 7:
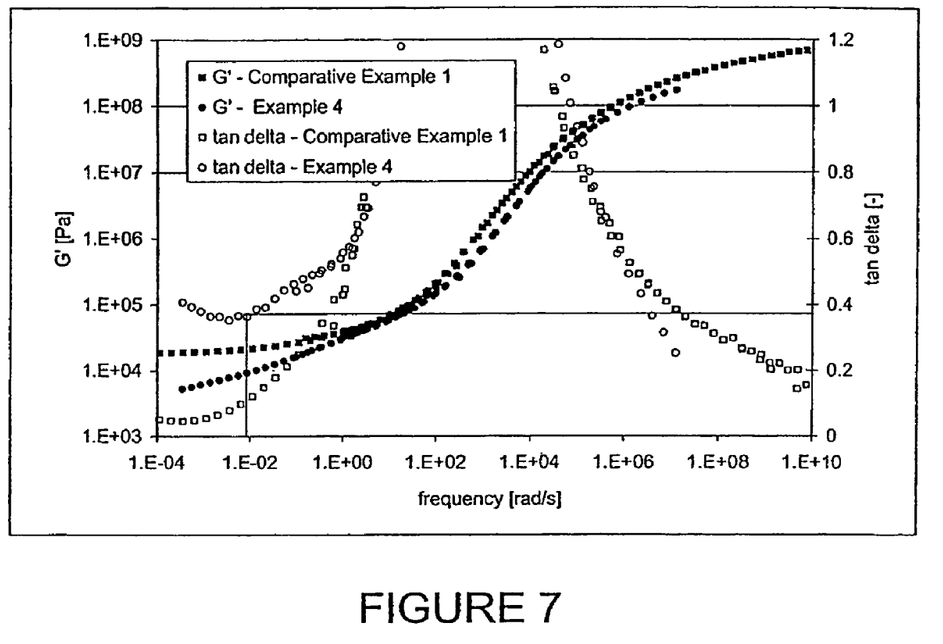
FIG. 7 plots G' and Tan δ for Example 4 overlaid with those of Comparative Example 1.

The dynamic rheological properties are shown in FIG. 7, where they are compared with those of Comparative Example 1. As can be seen, the plateau modulus at low frequencies is 5 000 Pa, lower than for the Comparative Example. G' intersects a value of 10 000 Pa at a frequency of 0.009 rad/s, where Tan δ equals 0.35.

Again, the data indicates that the use of this tetrablock polymer will be beneficial in die-cutting operations.

EXAMPLE 5

A SISB tetrablock copolymer in which the blocks were of molecular weight 9,200-32,540-9,200-97,600 respectively having an overall styrene content of 12 wt % was used. A hot melt formulation has been prepared with 31% of above polymer, 27% of Wingtack 10, and 42% of ECR 373. The resulting hot melt showed the following characteristics.

| Brookfield Viscosity (175° C. - mPa · s) | 12000 |
|---|---|
| Shear at room temperature (Hours) | |
| Steel - 25 * 25 mm 2 - 1 kg | 5-cf |
| 180° Peel on glass (N/25 mm) | |
| 300 mm/min - room temperature | 27.5 cf |
| 300 mm/min - 3° C. | 15.0 pt |
| 180° Peel on polyethylene (N/25 mm) | |
| 300 mm/min - room temperature | 25.5 cf |
| 300 mm/min - 3° C. | 22.0 pt |
| Loop tack on glass (N) | |
| 300 mm/min - room temperature | 46.0 cf |
| 300 mm/min - 3° C. | 3.8 j |
| | 0.6 af |
| Loop tack on polyethylene (N) | |
| 300 mm/min - room temperature | 35.0 cf |
| 300 mm/min - 3° C. | 6.0 j |
| Migration (% reflexion) | |
| 1 week 60° C. | 56 |
| 2 weeks 60° C. | 52 |
| 1 week 70° C. | 47.5 |
| 2 weeks 70° C. | 39.5 |

Figure 8:
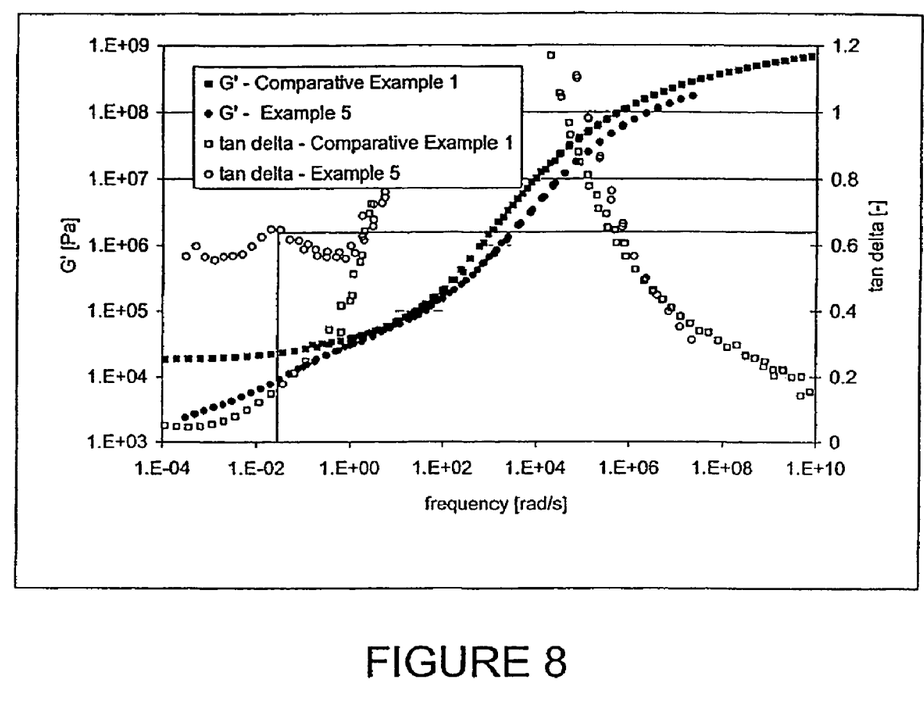
FIG. 8 plots G' and Tan δ for Example 5 overlaid with those of Comparative Example 1.

The dynamic rheological properties are shown FIG. 8, where they are compared with those of Comparative Example 1. As can be seen, the plateau modulus at low frequencies is 2 000 Pa, lower than for the Comparative Example. G' intersects a value of 10 000 Pa at a frequency of 0.03 rad/s, where Tan delta equals 0.65.

The data indicates that this tetrablock polymer will be beneficial in die-cutting operations.

We claim:

1. An adhesive comprising a tackifier and a styrenic block copolymer wherein the styrenic block copolymer comprises a tetrablock and/or a pentablock copolymer having a styrene content of 10-27 wt % and wherein the end block is derived from an unsaturated diene and is of higher molecular weight than the mid block, wherein the mid block is an unsaturated diene, the adhesive exhibiting the following properties, when measured at 20° C.:
   (i) a storage modulus plateau below 10,000 Pa at frequencies below the glass transition region;
   (ii) a storage modulus equal to 10,000 Pa at a frequency greater than 0.001 rad/s; and
   (iii) a loss factor Tan delta between 0.2 and 1 at the frequency at which the storage modulus is 10000 Pa, wherein the molecular weight is the number average molecular weight.

2. An adhesive according to claim 1 wherein the block copolymer contains blocks derived from styrene, isoprene and butadiene.

3. An adhesive according to claim 2 wherein the tackifier is a hydrocarbon resin.

4. An adhesive according to claim 3 wherein the tackifier is an aliphatic $C_5/C_6$ resin.

5. An adhesive according to claim 3 wherein the tackifier is an aromatic resin.

6. An adhesive according to claim 3 wherein the tackifier is an aromatic/aliphatic $C_5/C_9$ resin.

7. An adhesive according to claim 3 wherein the resin is hydrogenated.

8. An adhesive according to claim 3 wherein the tackifier is a rosin ester and/or a polyterpene.

9. An adhesive according to claim 3 wherein the tackifier is compatible with polyisoprene and polybutadiene blocks.

* * * * *